United States Patent
Chae et al.

(10) Patent No.: US 10,551,987 B2
(45) Date of Patent: Feb. 4, 2020

(54) MULTIPLE SCREEN MODE IN MOBILE TERMINAL

(71) Applicant: KT CORPORATION, Gyeonggi-do (KR)

(72) Inventors: Haeng-Suk Chae, Gyeonggi-do (KR); Kyoung-Tae Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/183,865

(22) Filed: Feb. 19, 2014

(65) Prior Publication Data
US 2014/0173498 A1  Jun. 19, 2014

Related U.S. Application Data

(63) Continuation of application No. 13/469,267, filed on May 11, 2012, now abandoned.

(30) Foreign Application Priority Data

May 11, 2011  (KR) ........................ 10-2011-0043882

(51) Int. Cl.
*G06F 3/0481* (2013.01)
*G09G 5/14* (2006.01)
*G06F 3/0488* (2013.01)

(52) U.S. Cl.
CPC ........ *G06F 3/0481* (2013.01); *G06F 3/04883* (2013.01); *G09G 5/14* (2013.01);
(Continued)

(58) Field of Classification Search
USPC ........................................ 715/702, 761, 778
See application file for complete search history.

(56) References Cited

U.S. PATENT DOCUMENTS

| 6,323,846 B1 | 11/2001 | Westerman et al. |
| 6,888,536 B2 | 5/2005 | Westerman et al. |

(Continued)

FOREIGN PATENT DOCUMENTS

| JP | 2006-012053 A | 1/2006 |
| JP | 2006-185273 A | 7/2006 |

(Continued)

OTHER PUBLICATIONS

Final Rejection dated May 13, 2015, for U.S. Appl. No. 13/469,267.
(Continued)

*Primary Examiner* — Christopher J Fibbi
*Assistant Examiner* — Wendy Nicholas
(74) *Attorney, Agent, or Firm* — IP Legal Services, LLC

(57) ABSTRACT

Provided are a method and a mobile terminal for simultaneously displaying at least two application windows on a display unit of a mobile terminal. The method may include displaying a first application window associated with a first application on an entire display area of the display unit, receiving a multi_screen mode initiation input from a user, dividing a display area of the display unit into at least two display areas including a first display area and a second display area in response to the multi_screen mode initiation input, and displaying the first application window and a second application window on the at least two display areas, respectively, in a multi_screen mode.

10 Claims, 10 Drawing Sheets

(52) U.S. Cl.
CPC .............. *G06F 2203/04803* (2013.01); *G09G 2340/145* (2013.01)

(56) References Cited

U.S. PATENT DOCUMENTS

| | | |
|---|---|---|
| 6,920,606 B1 | 7/2005 | Jablonski et al. |
| 7,339,580 B2 | 3/2008 | Westerman et al. |
| 7,469,381 B2 | 12/2008 | Ording |
| 7,479,949 B2 | 1/2009 | Jobs et al. |
| 7,587,683 B2 | 9/2009 | Ito et al. |
| 7,599,044 B2 | 10/2009 | Hotelling et al. |
| 7,614,008 B2 | 11/2009 | Ording |
| 7,619,618 B2 | 11/2009 | Westerman et al. |
| 7,633,076 B2 | 12/2009 | Huppi et al. |
| 7,653,883 B2 | 1/2010 | Hotelling et al. |
| 7,656,394 B2 | 2/2010 | Westerman et al. |
| 7,671,756 B2 | 3/2010 | Herz et al. |
| 7,694,231 B2 | 4/2010 | Kocienda et al. |
| 7,714,265 B2 | 5/2010 | Fadell et al. |
| 7,728,316 B2 | 6/2010 | Fadell et al. |
| 7,760,187 B2 | 7/2010 | Kennedy |
| 7,764,274 B2 | 7/2010 | Westerman et al. |
| 7,782,307 B2 | 8/2010 | Westerman et al. |
| 7,812,828 B2 | 10/2010 | Westerman et al. |
| 7,843,427 B2 | 11/2010 | Ording et al. |
| 7,844,914 B2 | 11/2010 | Andre et al. |
| 7,856,605 B2 | 12/2010 | Ording et al. |
| 7,864,163 B2 | 1/2011 | Ording et al. |
| 7,900,156 B2 | 3/2011 | Andre et al. |
| 7,934,156 B2 | 4/2011 | Forstall et al. |
| 7,940,250 B2 | 5/2011 | Forstall |
| 7,941,760 B2 | 5/2011 | Kocienda et al. |
| 7,956,849 B2 | 6/2011 | Anzures et al. |
| 7,966,578 B2 | 6/2011 | Tolmasky et al. |
| 7,975,242 B2 | 7/2011 | Forstall et al. |
| 7,978,176 B2 | 7/2011 | Forstall et al. |
| 7,978,182 B2 | 7/2011 | Ording et al. |
| 7,996,792 B2 | 8/2011 | Anzures et al. |
| 8,013,839 B2 | 9/2011 | Ording et al. |
| 8,014,760 B2 | 9/2011 | Forstall et al. |
| 8,060,825 B2 | 11/2011 | Chaudhri |
| 8,063,872 B2 | 11/2011 | Forstall et al. |
| 8,082,523 B2 | 12/2011 | Forstall et al. |
| 8,091,045 B2 | 1/2012 | Christie et al. |
| 8,106,856 B2 | 1/2012 | Matas et al. |
| 8,116,807 B2 | 2/2012 | Matas |
| 8,130,205 B2 | 3/2012 | Forstall et al. |
| 8,135,389 B2 | 3/2012 | Forstall et al. |
| 8,171,432 B2 | 5/2012 | Matas et al. |
| 8,209,606 B2 | 6/2012 | Ording |
| 8,223,134 B1 | 7/2012 | Forstall et al. |
| 8,239,784 B2 | 8/2012 | Hotelling et al. |
| 8,253,695 B2 | 8/2012 | Ganatra et al. |
| 8,255,003 B2 | 8/2012 | Forstall et al. |
| 8,749,484 B2 * | 6/2014 | de Paz .................. G06F 1/1616 345/156 |
| 2005/0149879 A1 * | 7/2005 | Jobs ...................... G06F 3/0481 715/796 |
| 2006/0022956 A1 | 2/2006 | Lengeling et al. |
| 2006/0026521 A1 | 2/2006 | Hotelling et al. |
| 2006/0026536 A1 | 2/2006 | Hotelling et al. |
| 2006/0033724 A1 | 2/2006 | Chaudhri et al. |
| 2006/0161870 A1 | 7/2006 | Hotelling et al. |
| 2006/0238518 A1 | 10/2006 | Westerman et al. |
| 2006/0238520 A1 | 10/2006 | Westerman et al. |
| 2006/0238522 A1 | 10/2006 | Westerman et al. |
| 2007/0070050 A1 | 3/2007 | Westerman et al. |
| 2007/0070051 A1 | 3/2007 | Westerman et al. |
| 2007/0078919 A1 | 4/2007 | Westerman et al. |
| 2007/0081726 A1 | 4/2007 | Westerman et al. |
| 2007/0152980 A1 | 7/2007 | Kocienda et al. |
| 2007/0171210 A1 | 7/2007 | Chaudhri et al. |
| 2007/0174788 A1 | 7/2007 | Ording |
| 2007/0174791 A1 | 7/2007 | Park et al. |
| 2007/0192726 A1 | 8/2007 | Kim et al. |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2008/0036743 A1 | 2/2008 | Westerman et al. |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0055263 A1 | 3/2008 | Lemay et al. |
| 2008/0055269 A1 | 3/2008 | Lemay et al. |
| 2008/0082930 A1 | 4/2008 | Omernick et al. |
| 2008/0094370 A1 | 4/2008 | Ording et al. |
| 2008/0098331 A1 | 4/2008 | Novick et al. |
| 2008/0122796 A1 | 5/2008 | Jobs et al. |
| 2008/0128182 A1 | 6/2008 | Westerman et al. |
| 2008/0165142 A1 | 7/2008 | Kocienda et al. |
| 2008/0165143 A1 | 7/2008 | Tolmasky et al. |
| 2008/0165145 A1 | 7/2008 | Herz et al. |
| 2008/0165147 A1 | 7/2008 | Christie et al. |
| 2008/0165148 A1 | 7/2008 | Williamson et al. |
| 2008/0165149 A1 | 7/2008 | Platzer et al. |
| 2008/0165151 A1 | 7/2008 | Lemay et al. |
| 2008/0165152 A1 | 7/2008 | Forstall et al. |
| 2008/0165153 A1 | 7/2008 | Platzer et al. |
| 2008/0165160 A1 | 7/2008 | Kocienda et al. |
| 2008/0168349 A1 | 7/2008 | Lamiraux et al. |
| 2008/0168353 A1 | 7/2008 | Anzures et al. |
| 2008/0168395 A1 | 7/2008 | Ording et al. |
| 2008/0168396 A1 | 7/2008 | Matas et al. |
| 2008/0201650 A1 | 8/2008 | Lemay et al. |
| 2008/0204426 A1 | 8/2008 | Hotelling et al. |
| 2008/0211775 A1 | 9/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0220752 A1 | 9/2008 | Forstall et al. |
| 2008/0222545 A1 | 9/2008 | Lemay et al. |
| 2008/0231610 A1 | 9/2008 | Hotelling et al. |
| 2008/0299953 A1 | 12/2008 | Rao |
| 2008/0320391 A1 | 12/2008 | Lemay et al. |
| 2008/0320419 A1 | 12/2008 | Matas et al. |
| 2009/0005011 A1 | 1/2009 | Christie et al. |
| 2009/0006570 A1 | 1/2009 | Forstall et al. |
| 2009/0006644 A1 | 1/2009 | Forstall et al. |
| 2009/0007017 A1 | 1/2009 | Anzures et al. |
| 2009/0021489 A1 | 1/2009 | Westerman et al. |
| 2009/0058830 A1 | 3/2009 | Herz et al. |
| 2009/0064049 A1 | 3/2009 | Pyhalammi et al. |
| 2009/0066728 A1 | 3/2009 | Ording |
| 2009/0070704 A1 | 3/2009 | Ording |
| 2009/0070705 A1 | 3/2009 | Ording |
| 2009/0077488 A1 | 3/2009 | Ording |
| 2009/0091550 A1 | 4/2009 | Lim et al. |
| 2009/0093276 A1 | 4/2009 | Kim et al. |
| 2009/0100462 A1 | 4/2009 | Park et al. |
| 2009/0160816 A1 | 6/2009 | Westerman et al. |
| 2009/0174680 A1 | 7/2009 | Anzures et al. |
| 2009/0177981 A1 | 7/2009 | Christie et al. |
| 2009/0178008 A1 | 7/2009 | Herz et al. |
| 2009/0244031 A1 | 10/2009 | Westerman et al. |
| 2009/0244032 A1 | 10/2009 | Westerman et al. |
| 2009/0244033 A1 | 10/2009 | Westerman et al. |
| 2009/0249236 A1 | 10/2009 | Westerman et al. |
| 2009/0251435 A1 | 10/2009 | Westerman et al. |
| 2009/0251438 A1 | 10/2009 | Westerman et al. |
| 2009/0251439 A1 | 10/2009 | Westerman et al. |
| 2009/0259958 A1 | 10/2009 | Ban |
| 2010/0031203 A1 * | 2/2010 | Morris ................ G06F 3/04883 715/863 |
| 2010/0048256 A1 | 2/2010 | Huppi et al. |
| 2010/0066698 A1 | 3/2010 | Seo |
| 2010/0079392 A1 * | 4/2010 | Chiang .................. G06F 3/041 345/173 |
| 2010/0081475 A1 * | 4/2010 | Chiang ................ G06F 3/0483 455/564 |
| 2010/0088634 A1 * | 4/2010 | Tsuruta ................ G06F 3/0481 715/800 |
| 2010/0095240 A1 | 4/2010 | Shiplacoff et al. |

(56) References Cited

U.S. PATENT DOCUMENTS

| | | | |
|---|---|---|---|
| 2010/0097338 A1* | 4/2010 | Miyashita | G06F 3/04883 345/173 |
| 2010/0123669 A1* | 5/2010 | Chae | G06F 3/0488 345/173 |
| 2010/0149092 A1 | 6/2010 | Westerman et al. | |
| 2010/0149134 A1 | 6/2010 | Westerman et al. | |
| 2010/0177056 A1 | 7/2010 | Kocienda et al. | |
| 2010/0188357 A1 | 7/2010 | Kocienda et al. | |
| 2010/0188358 A1 | 7/2010 | Kocienda et al. | |
| 2010/0192086 A1 | 7/2010 | Kocienda et al. | |
| 2010/0201634 A1* | 8/2010 | Coddington | G06F 3/04883 345/173 |
| 2010/0207879 A1 | 8/2010 | Fadell et al. | |
| 2010/0248788 A1 | 9/2010 | Yook et al. | |
| 2010/0259500 A1 | 10/2010 | Kennedy | |
| 2010/0283743 A1* | 11/2010 | Coddington | G06F 3/0485 345/173 |
| 2011/0061010 A1 | 3/2011 | Wasko | |
| 2011/0074710 A1* | 3/2011 | Weeldreyer | G06F 3/0481 345/173 |
| 2011/0080364 A1 | 4/2011 | Ording et al. | |
| 2011/0143769 A1 | 6/2011 | Jones et al. | |
| 2011/0154188 A1 | 6/2011 | Forstall et al. | |
| 2011/0202882 A1 | 8/2011 | Forstall et al. | |
| 2011/0210933 A1 | 9/2011 | Forstall | |
| 2011/0219303 A1 | 9/2011 | Forstall | |
| 2011/0235990 A1 | 9/2011 | Anzures et al. | |
| 2011/0254800 A1 | 10/2011 | Anzures et al. | |
| 2011/0275418 A1 | 11/2011 | Forstall et al. | |
| 2012/0001829 A1* | 1/2012 | Anttila | G06F 3/1431 345/1.1 |
| 2012/0005602 A1* | 1/2012 | Anttila | G06F 3/1431 715/761 |
| 2012/0084681 A1 | 4/2012 | Cassar | |
| 2012/0084736 A1* | 4/2012 | Sirpal | G06F 1/1616 715/863 |
| 2012/0092381 A1* | 4/2012 | Hoover | G06F 3/04883 345/662 |
| 2012/0105484 A1* | 5/2012 | Cui | G06F 3/0481 345/660 |
| 2012/0127207 A1 | 5/2012 | Matas et al. | |
| 2012/0159402 A1 | 6/2012 | Nurmi et al. | |
| 2012/0216139 A1 | 8/2012 | Ording et al. | |
| 2012/0218304 A1 | 8/2012 | Anzures et al. | |
| 2012/0221978 A1 | 8/2012 | Matas et al. | |
| 2012/0274581 A1 | 11/2012 | Kim | |
| 2012/0278750 A1 | 11/2012 | Abraham et al. | |
| 2013/0012273 A1 | 1/2013 | Sato | |
| 2013/0181885 A1 | 7/2013 | Tamura | |

FOREIGN PATENT DOCUMENTS

| | | |
|---|---|---|
| JP | 2008-192002 A | 8/2008 |
| JP | 2008-217704 A | 9/2008 |
| KR | 10-2001-0073967 A | 8/2001 |
| KR | 10-2003-0030774 A | 4/2003 |
| KR | 10-2006-0030270 A | 4/2006 |
| KR | 10-2006-0089021 A | 8/2006 |
| KR | 10-2007-0002816 A | 1/2007 |
| KR | 10-2007-0010331 A | 1/2007 |
| KR | 10-0688046 B1 | 3/2007 |
| KR | 10-0715832 B1 | 5/2007 |
| KR | 10-2007-0076936 A | 7/2007 |
| KR | 10-2007-0107888 A | 11/2007 |
| KR | 10-0775176 B1 | 11/2007 |
| KR | 10-2009-0033619 A | 4/2009 |
| KR | 10-2009-0034664 A | 4/2009 |
| KR | 10-2009-0034665 A | 4/2009 |
| KR | 10-2009-0060429 A | 6/2009 |
| KR | 10-2009-0106223 A | 10/2009 |
| KR | 10-2009-0107638 A | 10/2009 |
| KR | 10-2010-0025090 A | 3/2010 |
| KR | 10-2010-0032026 A | 3/2010 |
| KR | 10-2010-0050828 A | 5/2010 |
| KR | 10-2010-0099828 A | 9/2010 |
| KR | 10-2010-0134234 A | 12/2010 |
| KR | 10-2011-0023256 A | 3/2011 |

OTHER PUBLICATIONS

Non-Final Rejection dated Jan. 14, 2015, for U.S. Appl. No. 13/469,267.

Final Rejection dated Apr. 24, 2014, for U.S. Appl. No. 13/469,267.

\* cited by examiner (A)    (B)

(C)    (D)

(A)          (C)

(B)          (D)

MULTIPLE SCREEN MODE IN MOBILE TERMINAL

CROSS REFERENCE TO PRIOR APPLICATIONS

The present application is continuation application of U.S. patent application Ser. No. 13/469,267 (filed on May 11, 2012), which claims priority under 35 U.S.C. § 119 to Korean Patent Application No. 10-2011-0043882 (filed on May 11, 2011), which is hereby incorporated by reference in its entirety.

FIELD OF THE INVENTION

The present invention relates to a mobile terminal and, in particular, to displaying at least two application windows on a display unit of a mobile terminal.

BACKGROUND OF THE INVENTION

Various types of mobile terminals have been introduced. Most mobile terminals are equipped with a multi-touch sensing display unit. For example, a smart phone equipped with a multi-touch sensing display unit has become popular. The smart phone provides many convenient features to a user. A user may perform daily tasks using the smart phone instead of using other computing devices including a computer, a fax, and a phone.

Such a typical smart phone may display a graphic user interface to interact with a user and allow a user to perform multiple tasks simultaneously. Such a typical mobile terminal may, however, display one application window at a time although multiple applications are in operation as a background mode. For example, a typical mobile terminal may display only one application window associated with one that a user most recently activates among applications in operation. When a user wants to display another application window associated with another application running in a background mode, a user may be required to close a current application window and initiate another desired application to display an associated application window on a display unit. Such a manner of displaying application windows by opening and closing windows might be inconvenient to a user of the mobile terminal.

SUMMARY OF THE INVENTION

This summery is provided to introduce a selection of concepts in a selection of concepts in a simplified from that are further described below in the detailed description with reference to the drawings. This summery is not intended to identify key features or essential features of the claimed subject matter, nor is it intended to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, at least two application windows may be displayed on a display unit of a mobile terminal.

In accordance with another aspect of the present invention, a display area of a mobile terminal may be divided into at least two display areas in response to a multi_screen mode initiation input and application windows may be displayed in the at least two display areas simultaneously.

In accordance with another aspect of the present invention, a pinch input may initiate a dual_screen mode in a mobile terminal.

In accordance with an embodiment of the present invention, a method may be provided for simultaneously displaying at least two application windows on a display unit of a mobile terminal. The method may include displaying a first application window associated with a first application on an entire display area of the display unit, receiving a multi_screen mode initiation input from a user, dividing a display area of the display unit into at least two display areas including a first display area and a second display area in response to the multi_screen mode initiation input, and displaying the first application window and a second application window on the at least two display areas, respectively, in a multi_screen mode.

The receiving a multi_screen mode initiation input may include receiving an input from the user, determining whether the received input is made through at least one of a predetermined key button and a predetermined icon, which are designated for initiating the multi_screen mode, initiating the multi_screen mode when the received input is made through the at least one of the predetermined key button and the predetermined icon, otherwise, performing an operation associated the received input. The predetermined key button may be one of key buttons disposed on the mobile terminal and the predetermined icon may be one of a group of icons included in an initial graphic user interface displayed on the display unit of the mobile terminal.

The receiving a multi_screen mode initiation input may include receiving an input from the user, determining whether the received input is a pinch input, determining whether an associated pinching motion of the pinch input exceeds a range of shrinking an application window when the received input is the pinch input, initiating the multi_screen mode when the pinching motion exceeds the range of shrinking the first application window, otherwise, shrinking the first application window corresponding to the pinching motion of the pinch input.

The receiving a multi_screen mode initiation input may include receiving an input from the user, determining whether the received input is a spread input, determining whether an associated spreading motion of the spread input exceeds a range of expanding an application window when the received input is the spread input, initiating the multi_screen mode when the spreading motion exceeds the range of expanding the application window, otherwise, expanding the first application window corresponding to the expanding motion of the spread input.

The dividing a display area of the display unit may include dividing the display area vertically into a left side display area as the first display area and a right side display area as the second display area when the multi_screen mode is initiated.

The dividing a display area of the display unit may include dividing the display area horizontally into an upper side display area as the first display area and a lower side display area as the second display area when the multi_screen mode is initiated.

The displaying the first application window and the second application window may include reconfiguring the first application window corresponding to the first display area and displaying the first application window on the first display area, activating a second application previously selected by at least one of the user, a service provider, and a manufacturer of the mobile terminal, and displaying the second application window associated with the second application on the second display area.

After the displaying the first application window and a second application window, the method may include receiving a single_screen mode initiation input, closing one of the first application window and the second application window in response to, and associated with, the single_screen mode initiation input, and displaying the other one of the first application window and the second application window on an entire display area of the display unit in a single_screen mode.

The receiving a single_screen mode may include receiving an input from the user, determining whether the received input is through at least one of a predetermined key button and a predetermined icon corresponding to the single_screen mode, initiating the single_screen mode when the received input is the single_screen mode initiation input, otherwise, performing an operation associated with the received input. The predetermined key button may be one of key buttons disposed on the mobile terminal and the predetermined icon may be one of a group of icons included in an initial graphic user interface displayed on the display unit of the mobile terminal.

The receiving a single_screen mode may include receiving an input from the user, determining whether the received input is a request for closing one of the first application window and the second application window, initiating the single_screen mode when the received input is the request for closing one of the first application window and the second application window, otherwise, performing an operation associated with the received input.

The receiving a single_screen mode initiation input may includes receiving an input from the user, determining whether the received input is a pinch input, determining whether pinching motion of the pinch input exceeds a range of shrinking an application window when the received input is the pinch input, initiating the multi_screen mode when the pinching motion exceeds the range of shrinking an application window, and shrinking one, associated with the received input, of the first application window and the second application corresponding to the pinching motion of the pinch input.

The receiving a single_screen mode initiation input may include receiving an input from the user, determining whether the received input is a spread input, determining whether spreading motion of the spread input exceeds an allowable range of expanding an application window when the received input is the spread input, initiating the single_screen mode when the spreading motion exceeds the allowable range of expanding an application window, and expanding one, associated with the received input, of the first application window and the second application window corresponding to the expanding motion of the spread input.

In accordance with another embodiment of the present invention, a method may be provided for simultaneously displaying two application windows on a display unit of a mobile terminal. The method may include displaying a first application window associated with a first application on an entire display area of the display unit when activating the first application, receiving a dual_screen mode initiation input from a user, dividing a display area of the display unit into a first display area and a second display area in response to the dual_screen mode, and displaying the first application window on the first display area and a second application window on the second display area in the dual_screen mode.

The receiving a dual_screen mode initiation input may include receiving an input from the user, determining whether the received input is a pinch input, determining whether an associated pinching motion of the pinch input exceeds a range of shrinking an application window when the received input is the pinch input, initiating the dual_screen mode when the pinching motion exceeds the range of shrinking an application window, otherwise, shrinking the first application window corresponding to the pinching motion of the pinch input.

The displaying the first application window and a second application window may include reconfiguring the first application window corresponding to the first display area and displaying the first application window on the first display area, activating a second application previously selected by at least one of the user, a service provider, and a manufacturer of the mobile terminal, and displaying the second application window associated with the second application on the second display area.

After the displaying the first application window and a second application window, the method may include receiving a single_screen mode initiation input, closing one, associated with the single_screen mode initiation input, of the first application window and the second application window, and displaying the other one of the first application window and the second application window on an entire display area of the display unit of the mobile terminal in response to the single_screen mode.

The receiving a single_screen mode may include receiving an input from the user, determining whether the received input is a pinch input, determining whether an associated pinching motion of the pinch input exceeds a range of shrinking an application window when the received input is the pinch input, initiating the single_screen mode when the pinching motion exceeds the range of shrinking an application window, and shrinking one, associated with the received input, of the first application window and the second application corresponding to the pinching motion of the pinch input.

In accordance with another embodiment of the present invention, a mobile terminal may include a display unit, a touch input processor, and a controller. The display unit may be configured to sense a touch input made on a surface thereof, to determine coordinate values of the sensed touch input at a given interval, to display an application window on an entire display area in a single_screen mode, and to display at least two application windows separately on divided display areas in a multi_screen mode. The touch input processor may be configured to receive the coordinate value from the display unit and to determine whether the sensed touch input is a multi_screen mode initiation input or a single_screen mode initiation input based on the received coordinate values of the touch input. The controller may be configured to initiate at least one of a multi_screen mode and a single_screen mode based on the determination result of the touch input processor.

The touch input processor may determine whether the sensed touch input is at least one of a predetermined icon, a closing request, a pinch input, and a spread input based on the received coordinate values of the sensed touch input. In case that the sensed touch input is the predetermined icon, the touch input processor may determine that the sensed touch input is at least one of the multi_screen mode initiation input and the single_screen mode initiation input when the predetermined icon is associated with initiation of one of the multi_screen mode initiation input and the single_screen mode initiation input. In case that the sensed touch input is the closing request, the touch input processor may determine that the sensed touch input is the single_screen mode initiation input. In case that the sensed touch input is the pinch input, the touch input processor may determine that the pinch input is at least one of the multi_screen mode initiation input and the single_screen mode initiation input when pinching motion of the pinch input exceeds a range of shrinking an application window. In case that the sensed touch input is the spread input, the touch input processor may determine that the spread input is at least one of the multi_screen mode initiation input and the single_screen mode initiation input when spreading motion of the spread input exceeds a range of expanding an application window.

When the touch input is the multi_screen mode initiation input based on the determination result of the touch input processor, the controller may divide a display area of the display unit into at least two display areas including a first display area and a second display area, activate a second application previously selected by one of a user and a manufacturer of the mobile terminal, reconfigure a first application window corresponding to the first display area, display the reconfigured first application window on the first display area, and display a second application window associated with the second application on the second display area, wherein the first application window is an application window previously displayed on an entire display area of the display unit.

When the touch input is the single_screen mode initiation input based on the determination result of the touch input processor, the controller may close one, associated with the single_screen mode initiation input, of the first application window and the second application window, and display the other one of the first application window and the second application window on the entire display area of the display unit.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
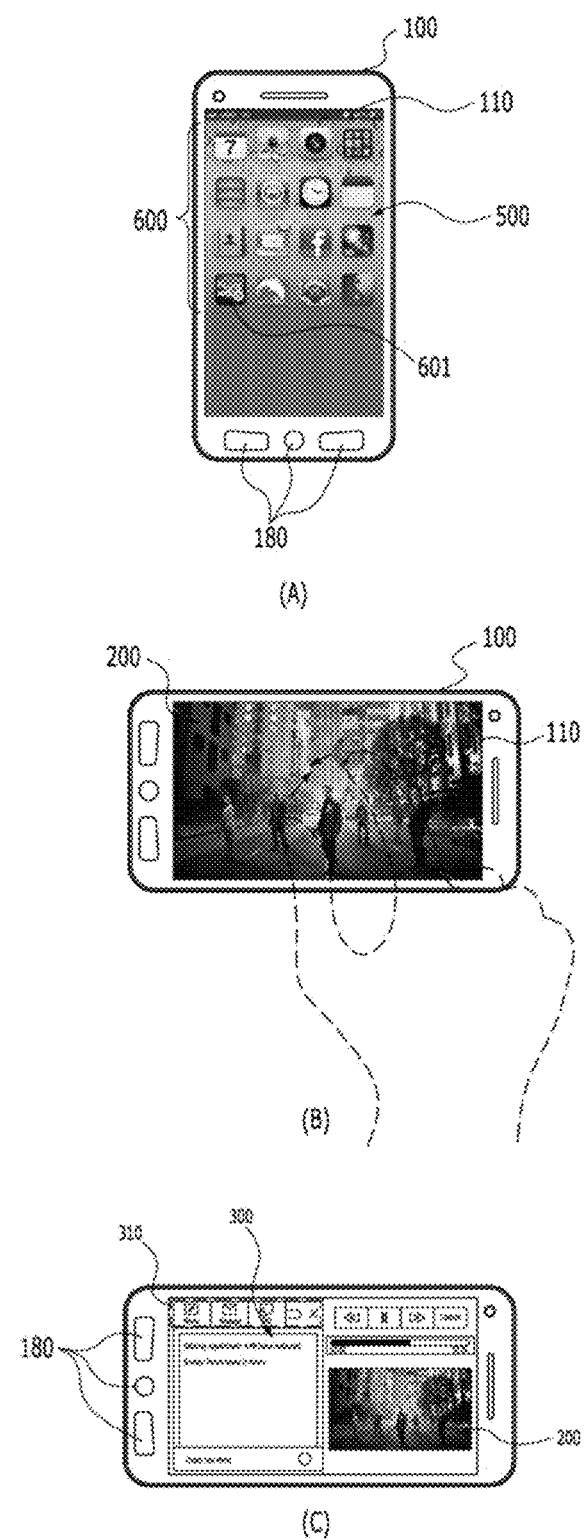
FIG. 1 shows a mobile terminal operating in a multi_screen mode in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, a mobile terminal may display at least two application windows on a display unit at the same time in a multi_screen mode. Such a multi_screen mode may be initiated by a pinch input. Furthermore, the multi_screen mode may be returned back to a single_screen mode by a single_screen mode initiation input in accordance with an embodiment of the present invention. In response to the single_screen mode initiation input, one of application windows may be closed and the other application window may be displayed on entire display area of a display unit.

FIG. 1 shows a mobile terminal operating in a multi_screen mode in accordance with an embodiment of the present invention.

Referring to FIG. 1, mobile terminal 100 may include display unit 110 and key buttons 180 in accordance with an embodiment of the present invention. Display unit 110 may be a touch sensing display unit. Particularly, display unit 110 may be a multi_touch sensing display unit that is capable of recognizing multiple points of contact made on a surface of display unit 110. Mobile terminal 100 may simultaneously display at least two application windows on display unit 110 in a multi_screen mode as shown in FIG. 1. Such a multi_screen mode may be initiated in response to a certain input made by a related user in accordance with an embodiment of the present invention. The certain input may be referred to as a multi_screen mode initiation input. The multi_screen mode initiation input may be set up by a user or a system designer. For example, one of key buttons 180 may be designated as a multi_screen mode initiation input. One of icons 600 displayed within initial graphic user interface 500 may be designated as multi_screen mode initiation input. The initial graphic user interface may be produced by an operating system, such as an android operating system, of mobile terminal 100. Particularly, a gesture input made on display unit 110 may be designated as the multi_screen mode initiation input. For example, a pinch input and/or a spread input may be designated as the multi_screen mode initiation input. The pinch input and the spread input will be described with reference to FIG. 3.

As shown in a diagram (A) of FIG. 1, mobile terminal 100 may display initial graphic user interface 500 on a display area of display unit 110 when mobile terminal 100 is activated. Initial graphic user interface 500 may be produced by an operating system of mobile terminal 100. For example, the operating system may be an android operating system, but the present invention is not limited thereto.

Initial graphic user interface 500 may include a plurality of icons 600 associated with applications installed in mobile terminal 100. Applications may be downloaded from a related server or directly installed from an external device by a related user. Initial graphic user interface 500 may enable a related user to interact with desired applications. The related user may initiate desired applications by touching icons 600 associated with the desired applications. For example, the related user may activate a movie player application, as a first application, by making a touch input on corresponding icon 601. In this case, mobile terminal 100 may display first application window 200 associated with the first application on display unit 110, as shown in a diagram (B). As shown in the diagram (B), a movie is played back on display unit 110 as first application window 200.

The user of mobile terminal 100 may activate a second application while the first application is running. In this case, mobile terminal 100 may transition the first application to a background mode and perform the second application in a foreground mode. That is, mobile terminal 100 may close first application window 200 associated with the first application and display a second application window which is associated with the second application. Typically, mobile terminal 100 may display one application window at a time although multiple applications are in operation. For example, a typical mobile terminal may display only one application window associated with one that a user most recently activates among applications in operation. When a user wants to display another application window associated with another application running in a background mode, a user may be required to close a current application window and initiate another desired application to display an associated application window on a display unit. For example, the typical android operating system for a mobile terminal does not simultaneously display two or more application windows on a display unit. Such a manner of displaying application windows by opening and closing windows might be inconvenient to a user of the mobile terminal.

In order to overcome such drawback of a typical mobile terminal, mobile terminal 100 in accordance with an embodiment of the present invention may display at least two application windows simultaneously as shown in a diagram (C) of FIG. 1. Such a multi_screen mode of mobile terminal 100 may be initiated through a certain input, defined herein as a multi_screen mode initiation input, applied by a user to mobile terminal 100. In a diagram (B) of FIG. 1, the multi_screen mode initiation input may be illustrated as a pinch input, but the present invention is not limited thereto. Such multi_screen mode initiation input may be a keypad input, a key button input, or another gesture input, set by a user or a system designer.

Referring to a diagram (B) of FIG. 1, when a user makes a pinch input on first application window 200, mobile terminal 100 may determine that the pinch input is a multi_screen mode initiation input when the pinch input exceeds a shrinking threshold, and activate a multi_screen mode in accordance with an embodiment of the present invention. For example, mobile terminal 100 may divide a display area of display unit 110 into two display areas. Mobile terminal 100 may reduce in size (i.e., re-size or otherwise "shrink") first application window 200 and display the re-sized first application window 200 on a right display area of display unit 110 and display second application window 300 on a left display area of display unit 110, as shown in a diagram (C) of FIG. 1. In a diagram (C) of FIG. 1, re-sized first application window 200 may be illustrated as being displayed on the right display area of display unit 110 and second application window 300 may be illustrated as being displayed on the left display area of display unit 110. The present invention, however, is not limited thereto. Re-sized first application window 200 may be displayed on a left display area of display unit 110 and second application window 300 may be displayed on a right display area of display unit 110. Furthermore, three or more application windows may be displayed in accordance with another embodiment of the present invention.

In accordance with an embodiment of the present invention, second application window 300 may be associated with an application that enables a user to select one of three applications. For example, second application window 300 may be associated with a multitasking application. Such an application may be selected and set up by a system designer in advance. As shown in a diagram (C) of FIG. 1, second application window 300 may include taps 310 for selecting one of three applications, for example, a memo application, a message application, and a social network service (SNS) application. The present invention, however, is not limited thereto. Second application window 300 may be associated with any applications installed in mobile terminal 100. A user may select and set up one of the applications to be activated and to display an associated application window on one of display areas of display unit 110 when the multi_screen mode is initiated. For example, when the multi_screen mode initiation input is made while a movie is played back as a first application window, mobile terminal 100 may display an application window associated with an application enable a user to select one of applications installed in mobile terminal 100 or display an initial graphic user interface on one of divided display areas in display unit 110. Such examples of displaying two application windows are illustrated and described subsequently in FIG. 9 and FIG. 10.

Such a multi_screen mode may be returned back to a single_screen mode in response to a certain input made by a related user in accordance with an embodiment of the present invention. The certain input may be referred to as a single_screen mode initiation input. The single_screen mode initiation input may be set up by a user or a system designer. For example, one of key buttons 180 may be designated as a single_screen mode initiation input. One of icons displayed within an initial graphic user interface may be designated as the single_screen mode initiation input. Particularly, a gesture input made on display unit 110 may be designated as the single_screen mode initiation input. For example, a pinch input and/or a spread input may be designated as the single_screen mode initiation input. The pinch input and the spread input will be described with reference to FIG. 3. In response to the single_screen mode initiation input, one of first and second application windows 200 and 300 may be closed and the other may be displayed on entire display area of device unit 110 in accordance with an embodiment of the present invention.

Figure 2:
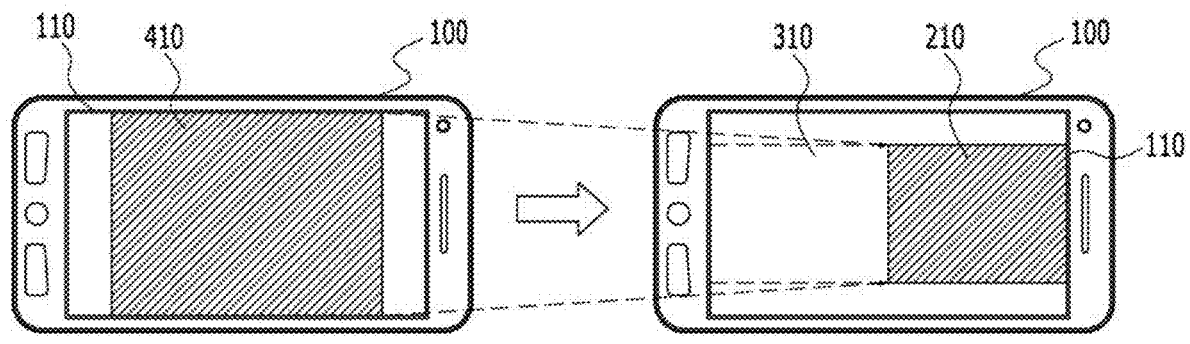
FIG. 2 shows a display area of a display unit, divided into two display areas in accordance with an embodiment of the present invention.
Figure 2:
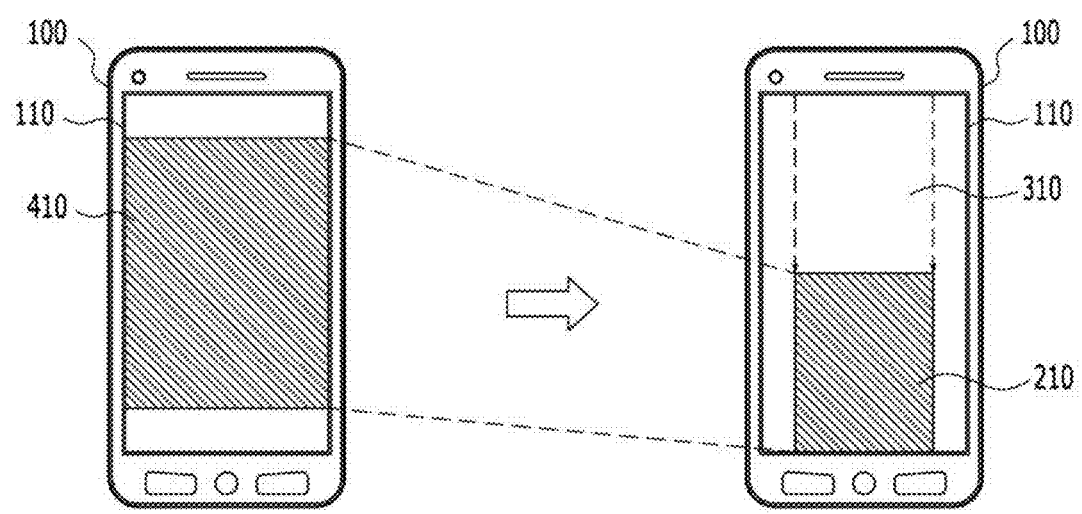

FIG. 2 shows a display area of a display unit, divided into two display areas in accordance with an embodiment of the present invention.

Referring to diagrams (A) and (B) of FIG. 2, display area 410 of display unit 110 may be divided into first display area 210 and second display area 310 in response to a multi_screen mode initiation input in accordance with an embodiment of the present invention. First display area 210 may be referred to as a main display area and second display area 310 may be referred to as a multitasking display area, but the present invention is not limited thereto. For example, first application window 200 displayed on entire display area 410 of display unit 110 may be reduced in size, or re-sized, in response to a multi_screen mode initiation input and re-sized first application window 200 may be displayed on first display area 210. Then, second application window 300 (FIG. 1 (C)) may be displayed on second display area 310.

Diagrams (A) and (B) of FIG. 2 illustrate display area 410 vertically divided into first display area 210 and second display area 310. The present invention, however, is not limited thereto. Display area 410 may be horizontally divided into lower display area 210 and upper display area 310 as shown in diagrams (C) and (D) of FIG. 2.

Furthermore, display area 410 may be illustrated as being divided in a ratio of 1:1 in FIG. 2, but the present invention is not limited thereto. That is, first display area 210 and second display area 310 may have the same size in FIG. 2. However, display area 410 may be divided in a ratio of x:y, for example, 2:1, 1:2, 3:1, or 1:3, in accordance with another embodiment of the present invention. That is, first display area 210 and second display area 310 may have different sizes in accordance with another embodiment of the present invention.

As described above, a multi_screen mode and a single_screen mode may be initiated in response to a multi_screen mode initiation input and a single_screen mode initiation input in accordance with an embodiment of the present invention. The multi_screen mode initiation input and the single_screen mode initiation input may be set up by a user or a system designer. For example, one of key buttons 180 may be designated as a multi_screen mode initiation input and a single_screen mode initiation input. One of icons displayed within an initial graphic user interface may be designated as multi_screen mode initiation input and a single_screen mode initiation input. Particularly, a gesture input made on display unit 110 may be designated as the multi_screen mode initiation input and a single_screen mode initiation input. For example, a pinch input and/or a spread input may be designated as the multi_screen mode initiation input and the single_screen mode initiation input when corresponding gestures exceed given thresholds.

In accordance with an embodiment of the present invention, the pinch input and the spread input are described as the multi_screen mode initiation input and the single_screen mode initiation input. Hereinafter, the pinch input and the spread input will be described with reference to FIG. 3.

Figure 3:
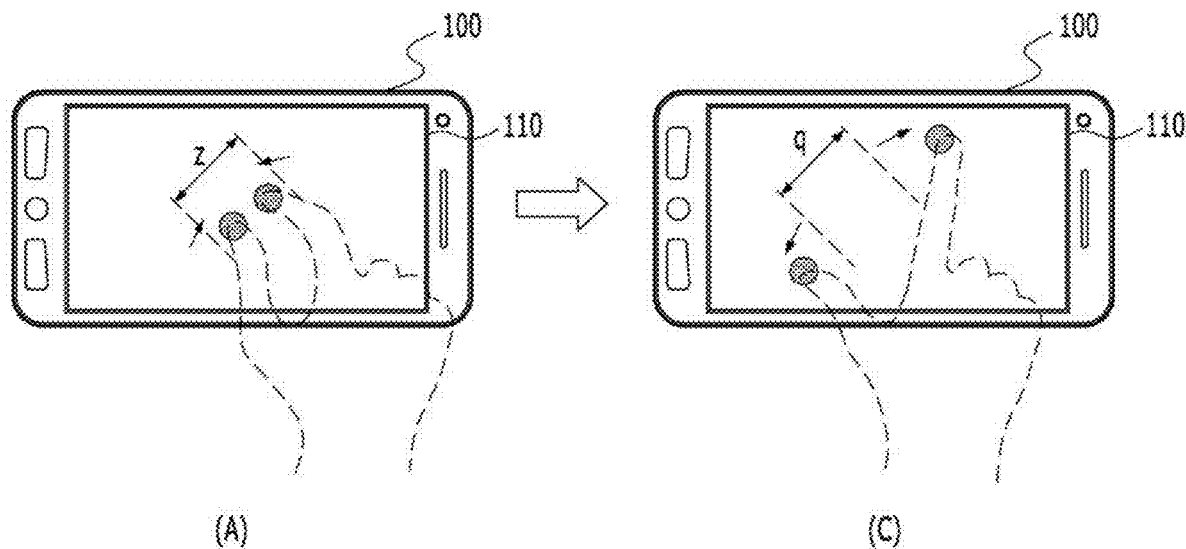
FIG. 3 shows gesture inputs for initiating a multi_screen mode in accordance with an embodiment of the present invention.
Figure 3:
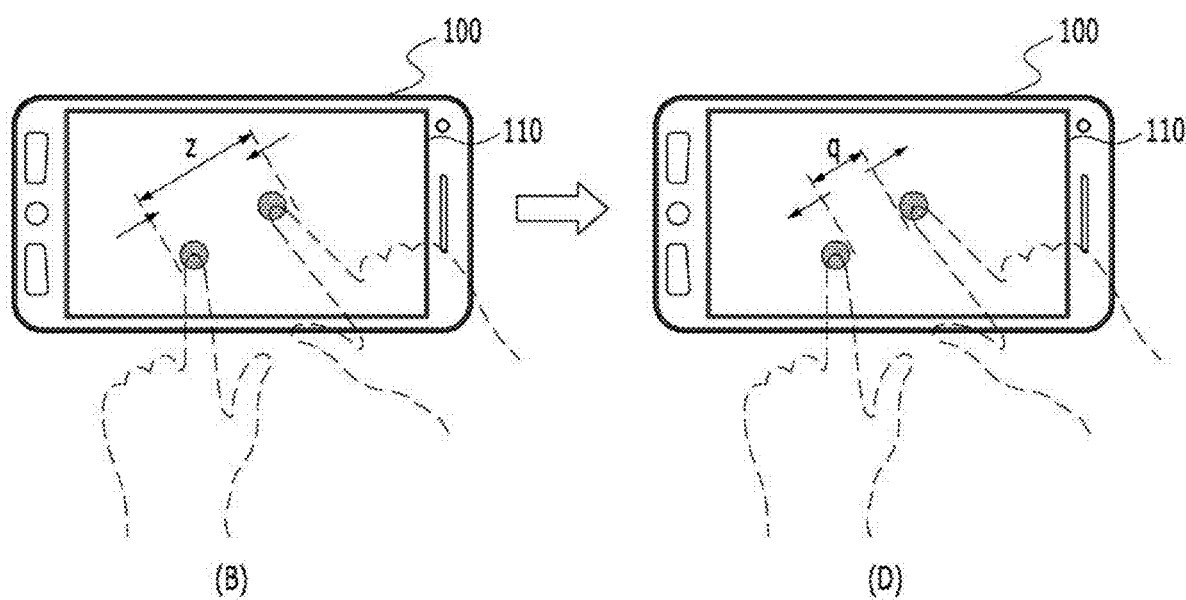

FIG. 3 shows gesture inputs for initiating a multi_screen mode in accordance with an embodiment of the present invention.

Referring to diagrams (A) and (B) of FIG. 3, a pinch input may be a multi_touch gesture made on a surface of display unit 110. The pinch input may be referred to as a two finger zoom input or a pinch to zoom input. The pinch input may be made by contacting two fingers on the surface of display unit 110 and dragging two fingers toward one point, as shown in diagrams (A) and (B). Such pinch input may be made using two fingers of one hand as shown in a diagram (A) or using one finger on each of two hands as shown in a diagram (B). The pinch input may be made typically for shrinking an application window displayed on display unit 110 of mobile terminal 100. In accordance with an embodiment of the present invention, the pinch input may be determined as one of the multi_screen mode initiation input and the single_screen mode initiation input when a pinching motion of the pinch input exceeds a shrinking threshold z. The shrinking threshold z may be a distance between two fingers, but the present invention is not limited thereto. For example, when the pinching motion exceeds an allowable range of shrinking an application window, mobile terminal 100 may determine that the pinch input is made as the multi_screen mode initiation input or the single_screen mode initiation input.

Referring to diagrams (C) and (D) of FIG. 3, a spread input may be a multi_touch gesture made on a surface of display unit 110. The spread input may be made by contacting two fingers on the surface of display unit 110 and dragging two fingers outward from one point, as shown in diagrams (C) and (D). Such spread input may be made using two fingers of one hand as shown in a diagram (C) or using one finger on each of two hands as shown in a diagram (D). The spread input may be made typically for expanding an application window displayed on display unit 110 of mobile terminal 100. In accordance with an embodiment of the present invention, the spread input may be determined as one of the multi_screen mode initiation input and the single_screen mode initiation input when a spreading motion of the spread input exceeds an expanding threshold q. The expanding threshold q may be a distance between two fingers, but the present invention is not limited thereto. For example, when the spreading motion exceeds an allowable range of expanding an application window, mobile terminal 100 may determine that the spread input is made as the multi_screen mode initiation input or the single_screen mode initiation input.

As described above, mobile terminal 100 may initiate a multi_screen mode and a single_screen mode in response to a multi_screen mode initiation input and a single_screen mode initiation input in accordance with an embodiment of the present invention. In the multi_screen mode, mobile terminal 100 may simultaneously display at least two application windows on display unit 110 in accordance with an embodiment of the present invention. Hereinafter, a mobile terminal for simultaneously displaying at least two application windows on a display unit in accordance with an embodiment of the present invention.

Figure 4:
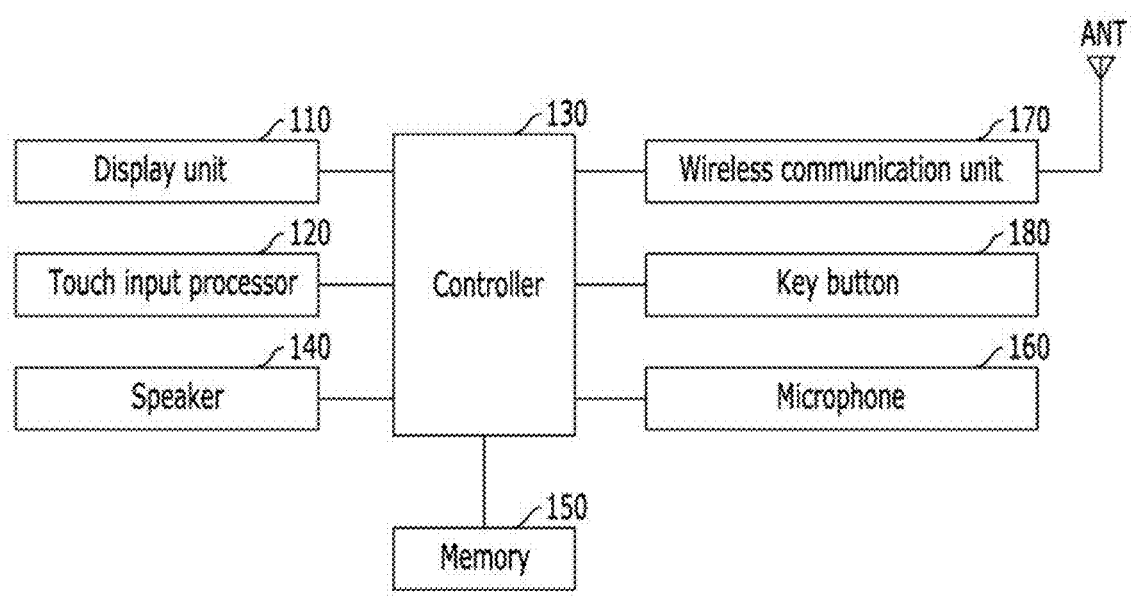
FIG. 4 shows a mobile terminal for simultaneously displaying at least two application windows in accordance with an embodiment of the present invention.

FIG. 4 shows a mobile terminal for simultaneously displaying at least two application windows in accordance with an embodiment of the present invention.

Referring to FIG. 4, mobile terminal 100 may include display unit 110, touch input processor 120, controller 130, speaker 140, memory 150, microphone 160, and wireless communication unit 170. Mobile terminal 100 may be a smart phone and operated by an android operating system, but the present invention is not limited thereto.

Display unit 110 may be a touch sensing display unit. Particularly, display unit 110 may be a multi_touch sensing display unit that is capable of recognizing multiple points of contacts made on a surface of display unit 110. Accordingly, display unit 110 may sense a touch input made by a user and provide the sensed touch input to touch input processor 120 in accordance with an embodiment of the present invention. For example, display unit 110 may sense a touch input made in a shape of a rectangle, a circle, and a line, detect a coordinate value (x, y) of the touch input at a regular interval such as about 20 ms, and provide the detected coordinate value (x, y) to touch input processor 120.

That is, display unit 110 may be an input unit for receiving a touch input as well as a display unit for displaying a graphic user interface including an application window. In accordance with an embodiment of the present invention, display unit 110 may receive a multi_screen mode initiation input and a single_screen mode initiation input as well as other touch inputs made for initiating a certain feature of mobile terminal 100. The touch input may include a tap input, a double tap input, a long press input, a scroll input, a pan input, a flick input, a two finger tap input, a two finger scroll input, a pinch input, a two hand pinch input, a spread input, a two hand spread input, a rotate input, and a two hand rotate input. Among the touch inputs, the pinch input and the spread input may be determined as the multi_screen mode initiation input and the single_screen mode initiation input when the pinch input and the spread input exceed given thresholds in accordance with an embodiment of the present invention. The present invention, however, is not limited thereto. Other touch inputs may be selected and set up as the multi_screen mode initiation input and the single_screen mode initiation input with certain conditions.

Display unit 110 may employ one of a capacitive overlay type touch screen, a resistive overlay type touch screen, an infrared beam type touch screen, and a surface acoustic wave type touch screen, but the present invention is not limited thereto. Display unit 110 may employ other types of touch screens to detect touch inputs made thereon by a user. Display unit 110 may detect values corresponding to touch inputs made thereon. Such values may be a potential difference value, a capacitance value, a wavelength, or an infrared ray (IR) interrupt value.

For example, in case of a resistive overlay type touch screen, display unit 110 may detect a potential difference on a position where a touch input is made. Display unit 110 may determine a coordinate value (x, y) of the position based on the detected potential difference and provide the coordinate value (x, y) to touch input processor 320.

Display unit 110 may display graphic user interfaces and application windows in response to control of controller 330. For example, display unit 110 may display initial graphic user interface 500 when mobile terminal 100 is initiated. Such initial graphic user interface 500 may be produced by an operating system of mobile terminal 100. Display unit 110 may display application windows associated with applications installed in mobile terminal 100. A user activates one of icons 600 (FIG. 1) associated with applications and in initial graphic user interface 500. Display unit 110 may display an application window associated with the activated application.

In accordance with an embodiment of the present invention, display unit 110 may simultaneously display at least two application windows on two divided display areas in a multi_screen mode. Further, display unit 110 may display only one application window on entire display area in a single_screen mode. Such operation of display unit 110 will be described with reference to FIG. 5 to FIG. 8.

Touch input processor 120 may receive coordinate values (x, y) associated with a touch input made on display unit 110 at a regular interval and determine a type of the touch input. For example, touch input processor 120 may determine whether a touch input is to activate an icon designated to initiate one of the multi_screen mode initiation input and the single_screen mode initiation input. Furthermore, touch input processor 120 may compare two consecutive coordinate values and detect an increment and/or a decrement of the coordinate values based on the comparison results. Touch input processor 120 may determine whether the touch input is a pinch input or a spread input based on the detected increment and decrement.

In accordance with an embodiment of the present invention, touch input processor 120 may determine whether or not a touch input made on display unit 110 is a pinch input for shrinking an application window or a pinch input for initiating a multi_screen mode or a single_screen mode. Particularly, touch input processor 120 may calculate an increment and/or a decrement by comparing two consecutive coordinate values received corresponding to a pinch input. Based on the increment or the decrement, touch input processor 120 may determine whether pinching motion exceeds the shrinking threshold z or not. When touch input processor 120 determines that pinching motion exceeds the shrinking threshold z, touch input processor 120 may determine that the pinch input is made for initiating the multi_screen mode or the single_screen mode. That is, when the pinch input is for shrinking an application window smaller than an allowable application window size, touch input processor 120 may determine that the pinch input is a multi_screen mode initiation input or a single_screen mode initiation input. In this case, touch input processor 120 may request controller 130 to control display unit 110 in the multi_screen mode or the single_screen mode.

In accordance with an embodiment of the present invention, touch input processor 120 may determine whether or not a touch input made on display unit 110 is a spread input for expanding an application window or a spread input for initiating a multi_screen mode or a single_screen mode. Particularly, touch input processor 120 may calculate increment or decrement by comparing two consecutive coordinate values received corresponding to a spread input. Based on the increment or the decrement, touch input processor 120 may determine whether spreading motion exceeds the expanding threshold q or not. When touch input processor 120 determines that spreading motion exceeds the expanding threshold q, touch input processor 120 may determine that the spread input is made for initiating the multi_screen mode or the single_screen mode. That is, when the spread input is for expanding an application window lager than an allowable application window size, touch input processor 120 may determine that the spread input is a multi_screen mode initiation input or a single_screen mode initiation input. In this case, touch input processor 120 may request controller 130 to control display unit 110 in the multi_screen mode or the single_screen mode.

However, the present invention is not limited thereto. For example, touch input processor 120 may detect a pinch input and a spread input and determine the pinch input and the spread input as the multi_screen mode initiation input or the single_screen mode initiation input regardless of exceeding a given threshold.

Controller 130 may control constituent elements of mobile terminal 100 in overall. In accordance with an embodiment of the present invention, controller 130 may control display unit 110 to be operated in the multi_screen mode or in the single_screen mode in response to certain touch inputs determined by touch input processor 120.

For example, when touch input processor 120 detects the multi_screen mode initiation input, controller 130 may divide display area 410 of display unit 110 into first display area 210 and second display area 310, display first application window 200 on first display area 210, and display second application window 300 on second display area 310. In case of the single_screen mode initiation input, controller 130 may close one of first and second display applications 200 and 300 and display the other on entire display area 410 of display unit 110.

In addition, controller 130 may detect the multi_screen mode initiation input and the single_screen mode initiation input received through key button 180. Such key button 180 may generate a signal when a user activate key button 180. In response to the signal, controller 130 may determine that the multi_screen mode or the single_screen mode is initiated. In this case, controller 130 may control display unit 110 to display application windows in the multi_screen mode or the single_screen mode without the determination of touch input processor 120.

Controller 130 may be illustrated as an independent unit from touch input processor 120 in FIG. 4. The present invention, however, is not limited thereto. Touch input processor 120 may be realized in controller 130 in accordance with another embodiment of the present invention.

Speaker 140 may receive an electric signal from controller 130, convert the electric signal to sound, and output the sound.

Memory 150 may store information necessary for operating mobile terminal 100 and performing certain operations requested by a user. Such information may include any software programs and related data. For example, memory 150 may store an operation system data, applications, and related data, received from an external device through a physical cable and downloaded from a related server from through a communication link. Memory 150 be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. Microphone 160 may convert sound of a user or around a user to an electric signal and output the electric signal to controller 130.

Wireless communication unit 170 may include at least one module for communicating with another party through a wireless communication system. For example, wireless communication unit 170 may include any or all of a duplexer, a radio frequency processor, and an intermediate processor. Wireless communication unit 170 may receive a radio frequency signal through an antenna ANT and the duplexer, convert the received radio frequency signal into an intermediate frequency signal, convert the intermediate frequency signal to a baseband signal again, and transmit the baseband signal to controller 130. Furthermore, wireless communication unit 170 may receive a baseband signal from controller 130, convert the baseband signal to an intermediate frequency signal and again to a radio frequency signal, and transmit the radio frequency signal through the antenna ANT.

Beside the constituent elements shown in FIG. 4, mobile terminal 100 may include other elements as well. For example, mobile terminal 100 may include a key input receiver (not shown) configured to receive various key inputs made through a key pad. The key input receiver may convert the key inputs to corresponding key codes and transmit the key codes to control 130. Control 130 may perform operations associated with the received key codes. Furthermore, mobile terminal 100 may include a camera module (not shown) including a complementary metal-oxide-semiconductor (CMOS) image sensor or a charge-coupled device (CCD) image sensor. The camera module may capture an image and process the captured image into a data format that can be displayed on display unit 110.

As described above, mobile terminal 100 may initiate the multi_screen mode or the single_screen mode in response to a certain touch input received from a user and simultaneously displays at least two application windows on display unit 110 in the multi_screen mode in accordance with an embodiment of the present invention. Hereinafter an operation of mobile terminal 100 in accordance with an embodiment of the present invention.

Figure 5:
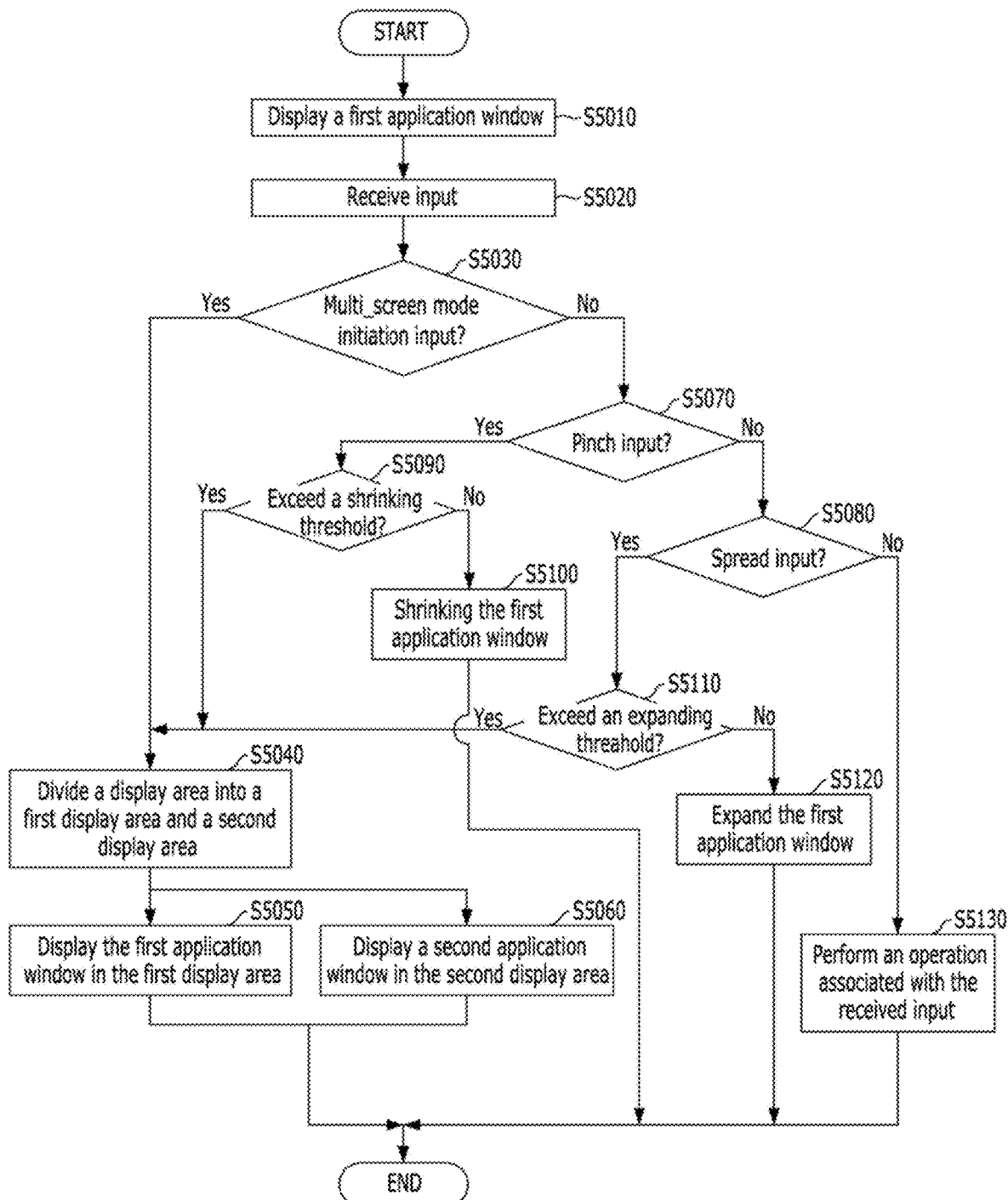
FIG. 5 shows a method for simultaneously displaying at least two application windows on a display unit of a mobile terminal in accordance with an embodiment of the present invention.

FIG. 5 shows a method for simultaneously displaying at least two application windows on a display unit of a mobile terminal in accordance with an embodiment of the present invention.

Referring to FIG. 5, when a user activates an application in a mobile terminal, a first application window associated with the activated application may be displayed on an entire display area of mobile terminal at step S5010. For example, mobile terminal 100 may display initial graphic user interface 500 when mobile terminal 100 is initiated. A user may activate icon 601 (e.g., FIG. 1) in initial graphic user interface 500 and mobile terminal 100 may display first application window 200 associated with icon 601 on entire display area 410 (e.g., FIG. 2). That is, mobile terminal 100 may display first application window 200 in a single_screen mode.

While displaying the first application window, an input may be received from a user at step S5020. For example, a related user may enter various types of inputs into mobile terminal 100 though at least one of graphic user interface 500, key buttons 180, and a key pad of mobile terminal 100 in order to perform a desired feature (e.g., FIG. 1). Particularly, the related user may enter an input to display second application window 300 associated with an application running as a background mode. In this case, the user may activate a multi_screen mode in order to display second application window 300 with first application window 200 at the same time on display unit 110 of mobile terminal 100. When the user wants to initiate the multi_screen mode, the user may enter a multi_screen mode initiation input. The multi_screen mode initiation input may be one of icons included in initial graphic user interface 500 displayed on display unit 110 of mobile terminal 100. Furthermore, the multi_screen mode initiation input may be one of keys in a keypad and key buttons, which is set up as the multi_screen mode initiation input by the user or a system designer. Particularly, the multi_screen mode initiation input may be a gesture input such as a pinch input. As described above, various types of inputs may be received from the user.

At step S5030, determination may be made whether the received input is for a multi_screen mode or not. As described above, when mobile terminal 110 receives an input, mobile terminal 110 may determine whether the received input is a multi_screen mode initiation input or not.

When the received input is the multi_screen mode initiation input (Yes—S5030), a display area may be divided into a first display area and a second display area at step S5040. For example, when mobile terminal 100 determines that the received input is the multi_screen mode initiation input, mobile terminal 100 may divide display area 410 into first display area 210 and second display area 310. The present invention, however, is not limited thereto. The display area may be divided into more than two display areas in accordance with another embodiment of the present invention. For convenience and ease of understanding, the display area will be described as being divided into two display areas, such as the first display area and the second display area.

At step S5050, the first application window may be displayed in the first display area. For example, mobile terminal 100 may reconfigure first application window 200, which was previously displayed on entire display area 410 of display unit 110, and display reconfigured first application window 200 in first display area 210. Since the entire display area is divided into two display areas, first application window 200 may be reduced in size to fit into first display area 210.

At step S5060, a second application window may be displayed in the second display area. For example, mobile terminal 100 may activate a second application previously selected by one of a user and a manufacturer of mobile terminal 100. Mobile terminal 100 may display second application window 300 in second display area 310. Second application window 300 may be associated with the activated second application. The second application may be a multitasking application previously selected by a manufacturer of mobile terminal 100. The multitasking application may enable a user to choose and to perform one from a set of selected applications. The present invention, however, is not limited thereto. The second application may be any application selected by a user or by mobile terminal 100 and a corresponding application window may be displayed on second display area 310. Instead of the applications, initial graphic user interface 500 may be displayed in the second display area as second application window 300.

As described above, the multi_screen mode initiation input may be gesture inputs having multiple purposes. For example, the multi_screen mode initiation input may be one of a pinch input may and/or a spread input when the pinch input and the spread input exceed a given corresponding threshold. Accordingly, when the input is not the multi_screen mode initiation input (No—S5030), determination may be made whether the received input is a pinch input or a spread input at step S5070 and at step S5080.

When the input is the pinch input (Pinch: Yes—S5070), determination may be made whether a pinching motion exceeds a shrinking threshold at step S5090. For example, mobile terminal 100 may determine whether the pinching motion exceeds an allowable shrinking range of an application window.

When the pinching motion does not exceed (No—S5090) the shrinking threshold, a shrinking operation may be performed at step S5100. For example, mobile terminal 100 may shrink first application window 200 corresponding to the pinch input made on display unit 110 of mobile terminal 100.

When the pinching motion exceeds the shrinking threshold (Yes—S5090), the pinching motion may be determined as the multi_screen mode initiation input and a display area may be divided into two display areas at step S5040. Then, the first application window and the second application window may be displayed on the first display area and the second display area correspondingly at steps S5050 and S5060.

When the received input is not the pinch input (Pinch: No—S5070), determination may be made whether the received input is the spread input at step S5080. When the received input is the spread input (Yes—S5080), determination may be made whether the spread input exceeds an expanding threshold at step S5110.

When the spread motion does not exceed the expanding threshold (No—S5110), an expanding operation may be performed at step S5120. For example, mobile terminal 100 may expand first application window 200 corresponding to the spread input made on display unit 110 of mobile terminal 100.

When the spread motion exceeds the expanding threshold (Yes—S5110), the spread motion may be determined as the multi_screen mode initiation input and a display area may be divided into two display areas at step S5040. Then, the first application window and the second application window may be displayed on the first display area and the second display area correspondingly at steps S5050 and S5060.

When the received input is not anyone of the multi_screen initiation input, the pinch input, and the spread input, an operation associated with the received input may be performed at step S5130.

The multi_screen mode may be returned back to a single_screen mode. That is, one of the displayed application windows may be closed and the other may be displayed on entire display area of display unit 110 of mobile terminal 100. Hereinafter, such an operation of transiting from a multi_screen mode to a single_screen mode in accordance with an embodiment of the present invention will be described with reference to FIG. 6.

Figure 6:
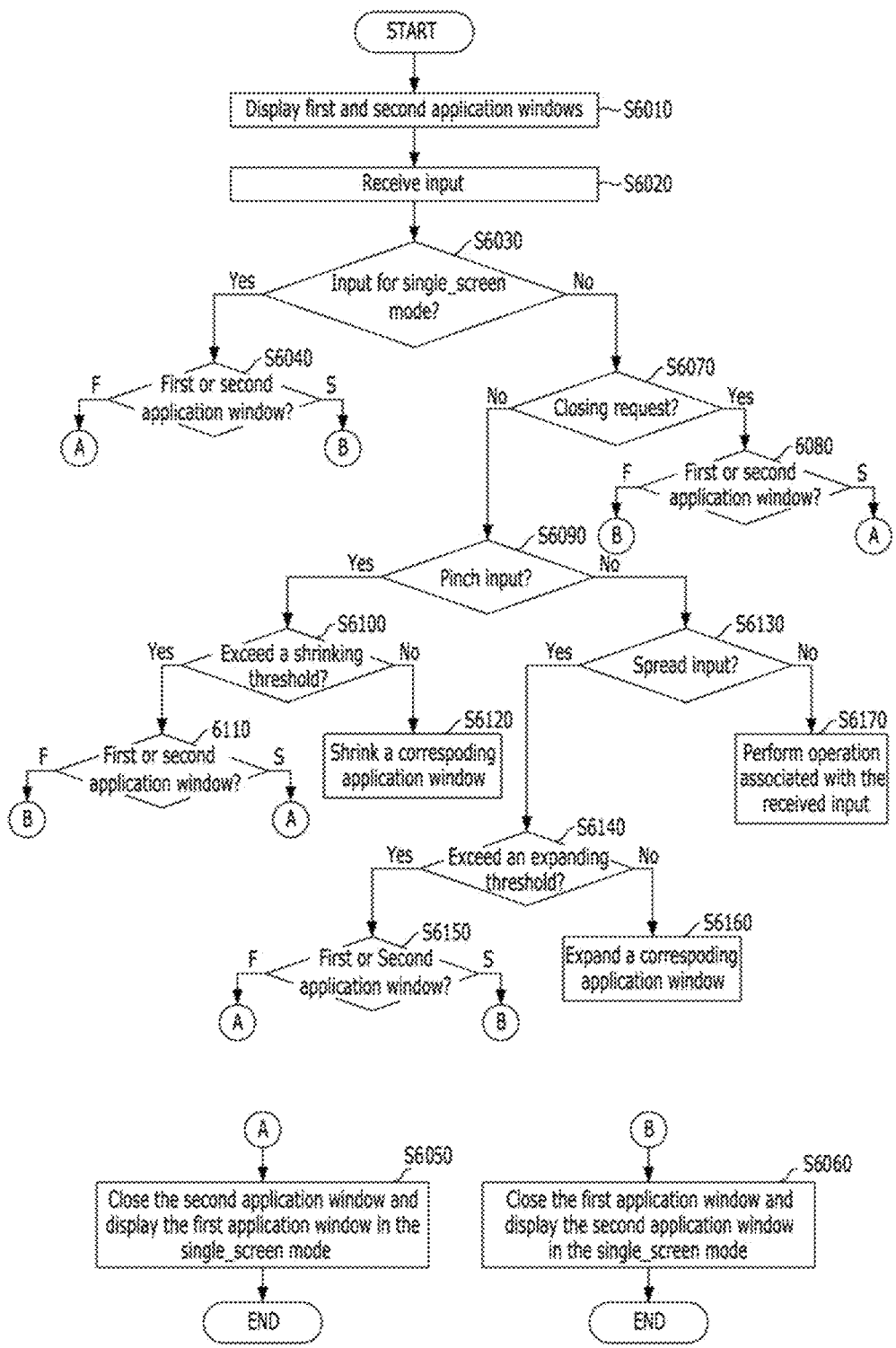
FIG. 6 shows a method for transiting from a multi_screen mode to a single_screen mode in accordance with an embodiment of the present invention.

FIG. 6 shows a method for transiting from a multi_screen mode to a single_screen mode in accordance with an embodiment of the present invention.

Referring to FIG. 6, a first application window and a second application window may be simultaneously displayed on a display unit of a mobile terminal in a multi_screen mode at step S6010. For example, first application window 200 may be displayed in first display area 210 and second application window 300 may be displayed in second display area 310.

While displaying the first and second application windows in the multi_screen mode, an input may be received at step S6020. For example, mobile terminal 110 may receive various types of inputs each for a specific purpose. Accordingly, determination may be made as to whether the received input is a single_screen mode initiation input or not at step S6030. Similar to the multi_screen mode initiation input, the single_screen mode initiation input may be received key button 180 or an icon, which may be selected and designated as the single_screen mode initiation input. Furthermore, the single_screen mode initiation input may be a pinch input or a spread input with a certain condition. In addition, the single_screen mode initiation input may be a closing request for closing one of the first and second application windows displayed on display unit 110 of mobile terminal 100.

When the received input is the single_screen mode initiation input (Yes—S6030), determination may be made as to whether the single_screen mode initiation input is associated with the first application window or the second application window at step S6040.

When the single_screen mode initiation input is associated with the first application window (First: F—S6040), the second application window may be closed and first application window may be displayed on entire display area at step S6050. When the single_screen mode initiation input is associated with the second application window (Second: S—S6040), the first application window may be closed and the second application window may be displayed on entire display area of the display unit at step S6060.

As described above, the single_screen mode may be initiated by closing one of application windows displayed on the display unit. Accordingly, when the received input is not the single_screen mode initiation input (No—S6030), determination may be made as to whether the received input is a request for closing one of the first and second application windows at step S6070.

When the received input is the closing request (Yes—S6070), determination may be made whether the closing request is associated with the first application window or the second application window at step S6080. When the closing request is associated with the first application window (First: F—S6080), the first application window may be closed and the second application window may be displayed on entire display area at step S6060. When the received input is associated with the second application window (Second:

S—S6080), the second application window may be closed and the first application window may be displayed on entire display area at step S6050.

As described above, the single_screen mode may be initiated by a pinch input or a spread input when the pinch input or the spread input exceed a given threshold. Accordingly, when the received input is not the single_screen mode initiation input and is not the closing request, determination may be made as to whether the received input is a pinch input at step S6090. When the received input is the pinch input (Yes—S6090), determination may be made as to whether the pinch input exceed a shrinking threshold at step S6100. When the pinch input exceed the shrinking threshold (Yes—S6100), determination may be made as to whether the pinch input is made associated with first application window or second application window at step S6110.

When the pinch input is made associated with first application window (First: F—S6110), the first application window may be closed and the second application window may be displayed on entire display area at step S6060. The present invention, however, is not limited thereto. In accordance with another embodiment of the present invention, the second application window may be closed and the first application window may be displayed on entire display area.

When the pinch input is made associated with the second application window (Second: S—S6110), the second application window may be closed and the first application window may be displayed in entire display area at step S6050. The present invention, however, is not limited thereto. In accordance with another embodiment of the present invention, the first application window may be closed and the second application window may be displayed on entire display area.

When the pinch input does not exceed the shrinking threshold (No—S6100), a corresponding application window may be re-sized, for example, shrunk corresponding to the pinch input at step S6120.

When the received input is not the pinch input (No—S6090), determination may be made whether the received input is a spread input at step S6130. When the received input is the spread input (Yes—S6130), determination may be made as to whether the spread input exceeds an expanding threshold at step S6140. When the spread input exceeds the expanding threshold (Yes—S6140), determination may be made as to whether the spread input is made associated with first application window or the second application window at step S6150.

When the spread input is made associated with the first application window (First: F—S6150), the first application window may be displayed on entire display area and the second application window may be closed at step S6050. The present invention, however, is not limited thereto. In accordance with another embodiment of the present invention, the first application window may be closed and the second application window may be displayed on entire display area.

When the spread input is made associated with the second application window (Second: S—S6150), the second application window may be displayed on entire display area and the first application window may be closed at step S6060. The present invention, however, is not limited thereto. In accordance with another embodiment of the present invention, the second application window may be closed and the first application window may be displayed on entire display area.

When the spread input does not exceed the expanding threshold (No—S6140), a corresponding application window may be expanded corresponding to the spread input at step S6160. When the received input is not a spread input (No—S6130), an operation associated with the received input may be performed at step S6170.

As described above, at least two application windows may be displayed on display unit 110 of mobile terminal 100 in the multi_screen mode in accordance with an embodiment of the present invention. Furthermore, the multi_screen mode and the single_screen mode may be initiated by variation types of inputs in accordance with an embodiment of the present invention. However, the present invention is not limited thereto. For simple implementation and ease of use, the mobile terminal may allow only two application windows to be simultaneously displayed on display unit 110 of mobile terminal 100 in accordance with another embodiment of the present invention. That is, two application windows may be displayed at the same time in a dual_screen mode. Furthermore, such a dual_screen mode and a single_screen mode may be initiated with a pinch input in accordance with another embodiment of the present invention. Hereinafter, a method for displaying two application windows in a dual_screen mode and returning back to a single_screen mode in accordance with another embodiment of the present invention will be described.

Figure 7:
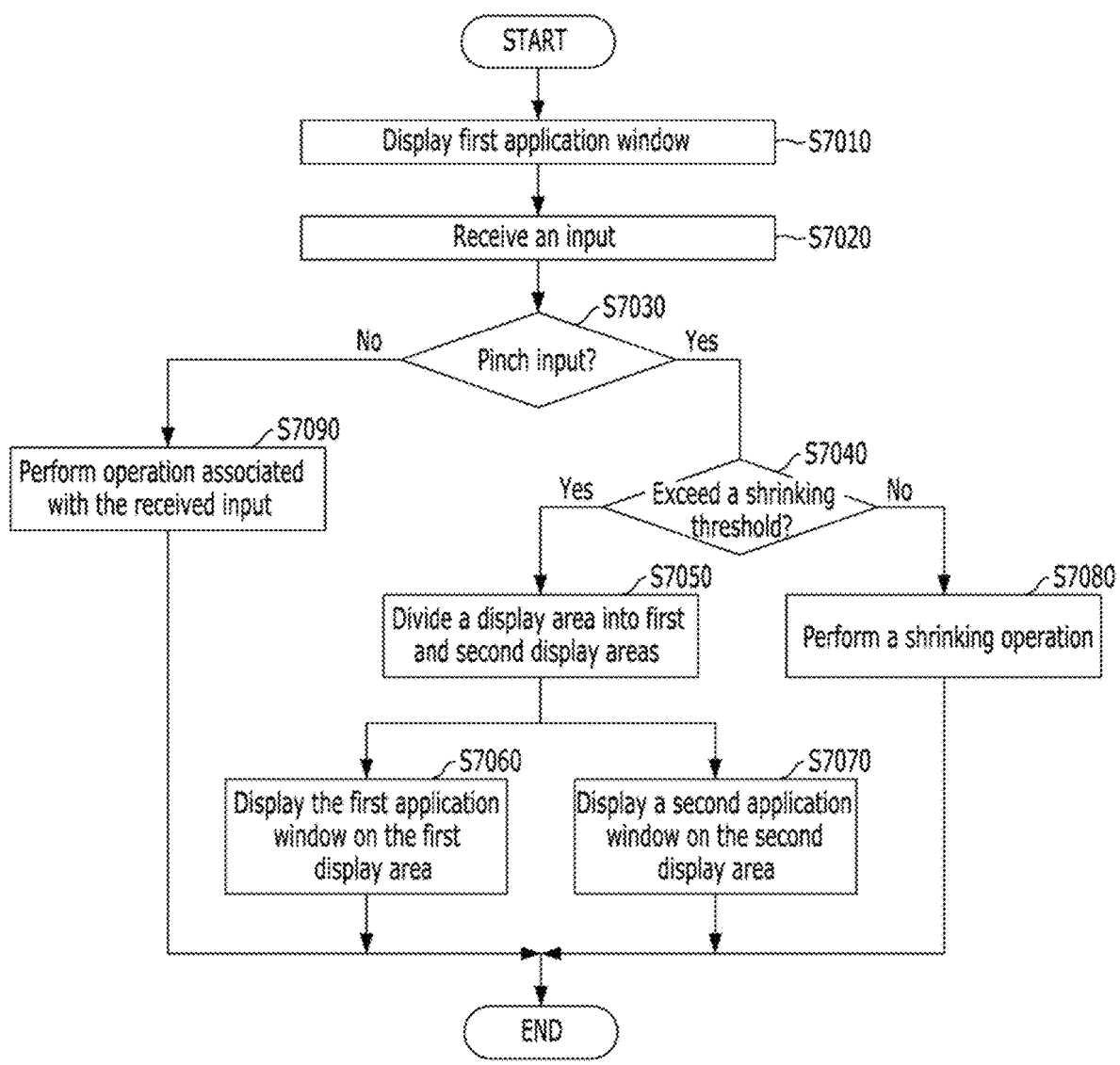
FIG. 7 shows a method for displaying two application windows on a display unit of a mobile terminal in a dual_screen mode in response to a pinch input in accordance with another embodiment of the present invention.

FIG. 7 shows a method for displaying two application windows on a display unit of a mobile terminal in a dual_screen mode in response to a pinch input in accordance with another embodiment of the present invention.

Referring to FIG. 7, when a user activates an application in a mobile terminal, a first application window associated with the activated application may be displayed on an entire display area of mobile terminal at step S7010. While displaying the first application window, an input may be received from a user at step S7020. Determination may be made whether the received input is a pinch input at step S7030.

When the input is the pinch input (Yes—S7030), determination may be made whether a pinch motion exceeds a shrinking threshold at step S7040. For example, mobile terminal 100 may determine whether the pinching motion exceeds a shrinking range of an application window.

When the pinch motion exceeds the shrinking threshold (Yes—S7040), the pinching motion may be determined as the dual_screen mode initiation input and a display area may be divided into two display areas at step S7050. Then, the first application window and the second application window may be displayed on the first display area and the second display area, respectively, at steps S7060 and S7070.

When the pinch motion does not exceed the shrinking threshold (No—S7040), a shrinking operation may be performed at step S7080. For example, mobile terminal 100 may shrink first application window 200 corresponding to the pinch input made on display unit 110 of mobile terminal 100. When the received input is not the pinch input (No—S7030), an operation associated with the received input may be performed at step S7090.

Figure 8:
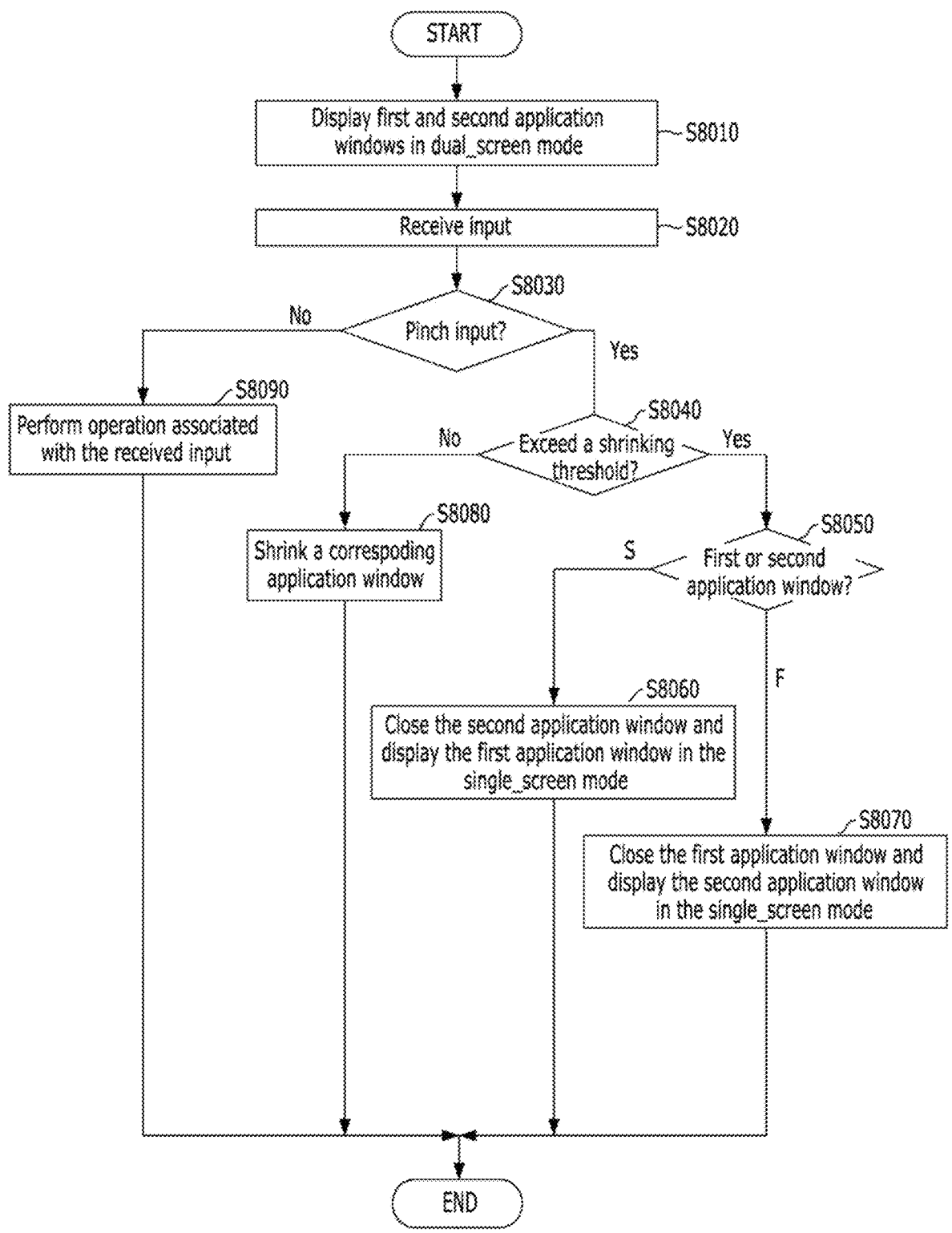
FIG. 8 shows a method for returning back to a single_screen mode from a dual_screen mode in response to a pinch input in accordance with another embodiment of the present invention.

FIG. 8 shows a method for returning back to a single_screen mode from a dual_screen mode in response to a pinch input in accordance with another embodiment of the present invention.

Referring to FIG. 8, a first application window and a second application window may be simultaneously displayed on a display unit of a mobile terminal in a dual_screen mode at step S8010.

While displaying the first and second application windows in the dual_screen mode, an input may be received at step S8020. Determination may be made as to whether the received input is a pinch input at step S8030.

When the received input is the pinch input (Yes—S8030), determination may be made as to whether the pinch input exceed a shrinking threshold at step S8040.

When the pinch input exceed the shrinking threshold (Yes—S8040), determination may be made as to whether the pinch input is made associated with first application window or second application window at step S8050.

When the pinch input is made associated with first application window (First—S8050), the first application window may be closed and the second application window may be displayed on entire display area at step S8070. The present invention, however, is not limited thereto. In accordance with another embodiment of the present invention, the second application window may be closed and the first application window may be displayed on entire display area.

When the pinch input is made associated with the second application window (Second—S8050), the second application window may be closed and the first application window may be displayed in entire display area at step S8060. The present invention, however, is not limited thereto. In accordance with another embodiment of the present invention, the first application window may be closed and the second application window may be displayed on entire display area.

When the pinch input does not exceed the shrinking threshold (No—S8040), a corresponding application window may be re-sized, for example, shrunk corresponding to the pinch input at step S8080. When the received input is not the pinch input (No—S8030), an operation associated with the received input may be performed at step S8090.

Figure 9:
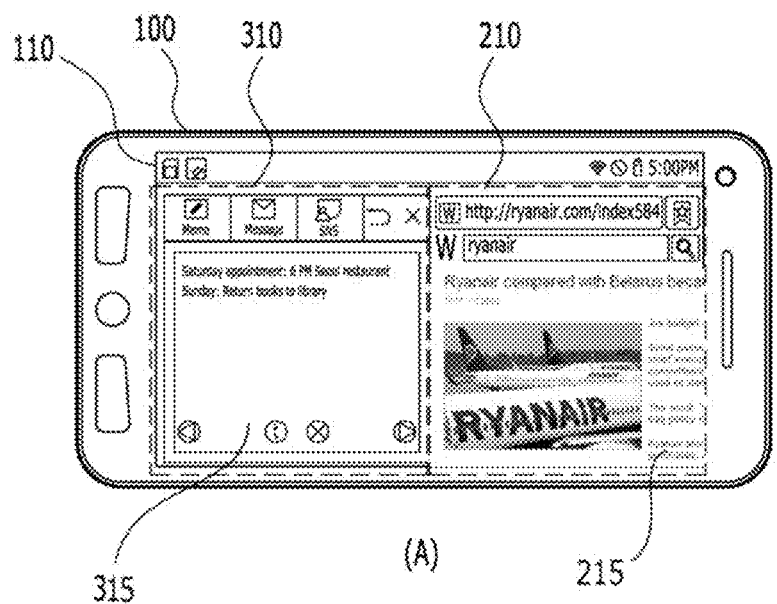
FIG. 9 shows a mobile terminal displaying two application windows in a dual_screen mode in accordance with an embodiment of the present invention.
Figure 9:
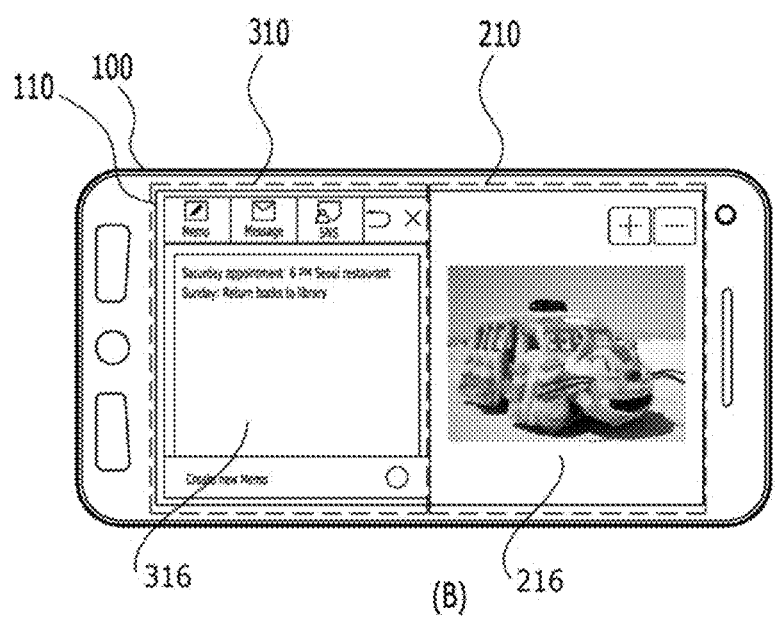

FIG. 9 shows a mobile terminal displaying two application windows in a dual_screen mode in accordance with an embodiment of the present invention.

Referring to a diagram (A) of FIG. 9, mobile terminal 100 may display memo application 315 in second display area 310 and display web-browser 215 in first display area 210 of display unit 110. Referring to a diagram (B) of FIG. 9, mobile terminal 100 may display memo application 316 in second display area 310 and display image viewer 216 in first display area 210 of display unit 110. As shown, various applications may be displayed in the dual_screen mode in accordance with an embodiment of the present invention.

Figure 10:
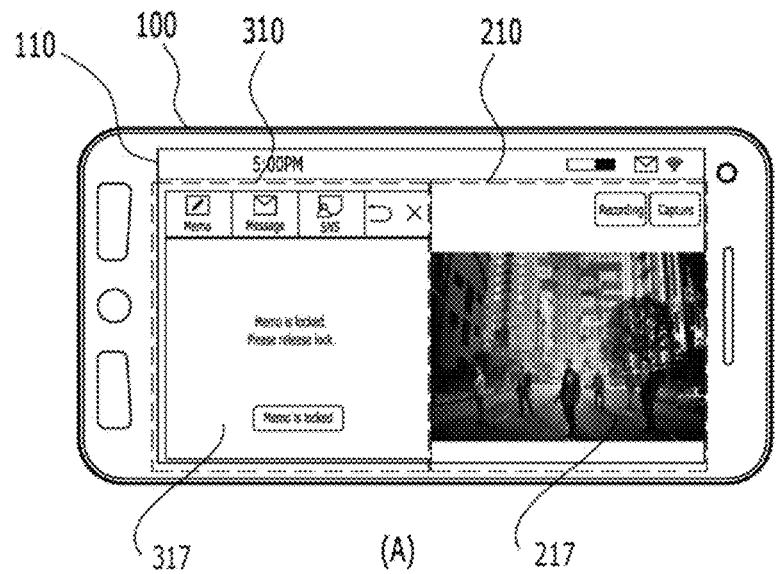
FIG. 10 shows a mobile terminal displaying two application windows in a dual_screen mode in accordance with another embodiment of the present invention.
Figure 10:
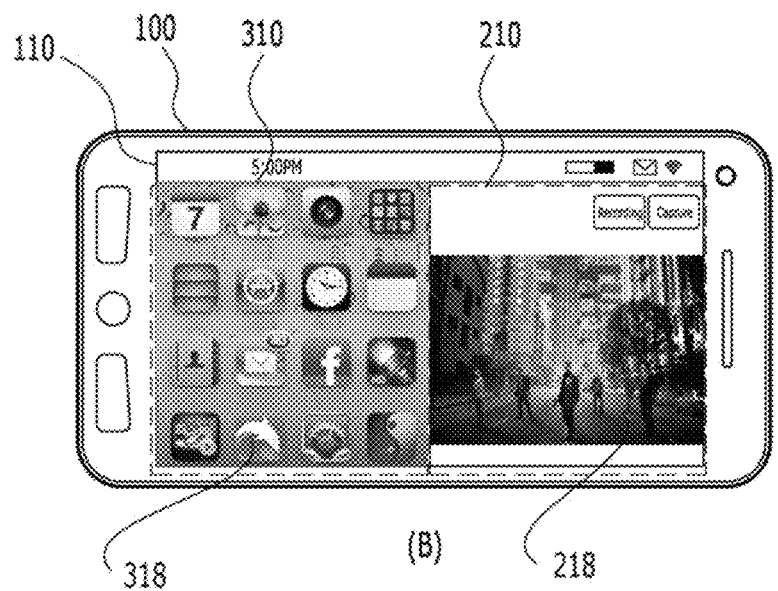

FIG. 10 shows a mobile terminal displaying two application windows in a dual_screen mode in accordance with another embodiment of the present invention.

As shown in a diagram (A) of FIG. 10, mobile terminal 100 may play movie 217 on first display area 210, which is received through a DMB player included in mobile terminal 100, and display application window 317 associated with a memo application in second display area 310. As shown in a diagram (B) of FIG. 10, mobile terminal 100 may display reduced-size initial graphic user interface 318 on second display area 310 and display movie 218 on first display area 210.

As shown, various application windows may be displayed on first display area 210 and second display area 310 at the same time in the multi_screen mode in accordance with an embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of switching between a single-screen mode and a multi-screen mode on a single display unit of a mobile terminal, the method comprising:
    displaying a first application window associated with a first application on an entire display area of the single display unit in the single-screen mode;
    receiving a multi-screen mode initiation input from a user, the multi-screen mode initiation input including a first two-touch input made on a display region of the first application window with the first two-touch having a distance therebetween, wherein the first two-touch input is determined as the multi-screen mode initiation input when the distance between the first two-touch reaches a predetermined first threshold distance;
    displaying, in response to the multi-screen mode initiation input, simultaneously at least the first application window and a second application window on separate respective divided display areas of the single display unit, wherein the second application window displays at least one of a multi-tasking selection window, a second application and an initial graphic user interface of the mobile terminal input; and
    returning to the single-screen mode in response to a single-screen mode initiation input from the user, the single-screen mode initiation input including a second two-touch input not corresponding to a closing request for closing an application, from the user, wherein the second two-touch input is a touch input made on one of the divided display areas and the second two-touch input reaches a predetermined second threshold distance; and
    automatically closing one of the first and second application windows in response to the second two-touch input, and displaying the remaining one of the first and second application windows on the entire display area of the of the single display unit in the single-screen mode, wherein when the second two-touch input is a pinch input, the corresponding application window within the divided display area that received the touch input is closed or when the second two-touch input is a spread input, the corresponding application window within the divided display area that did not receive the input is closed.

2. The method of claim 1, wherein the second application window includes taps for enabling a user to select the one of the plurality of applications.

3. The method of claim 1, wherein the second application window includes icons for enabling a user to select the one of the plurality of applications.

4. The method of claim 1, wherein the multi-tasking selection window includes icons for at least one of a memo application, a message application and a social network service application in order to enable a user to select the at least one of the memo application, the message application, and the social network service application.

5. The method of claim 4, wherein the one selected by the user is performed within the second application window.

6. The method of claim 1, wherein the multi-screen mode initiation input includes a pinch input.

7. The method of claim 6, wherein the pinch input is determined as the multi-screen mode initiation input when a pinching motion of the pinch input exceeds a shrinking threshold.

8. The method of claim 1, wherein the single screen initiation input includes a spread input.

9. The method of claim 8, wherein the spread input is determined as the single-screen mode initiation input when a spreading motion of the spread input exceeds an expanding threshold.

10. The method of claim 1, wherein the displaying includes:
    displaying simultaneously at least three application windows in response to the multi-screen mode initiation input.

* * * * *